United States Patent
Kirschbauer et al.

(10) Patent No.: US 7,931,270 B2
(45) Date of Patent: Apr. 26, 2011

(54) METHOD AND SYSTEM FOR PERSONALIZING A MULTIPLICITY OF SECURITY DOCUMENTS USING A PLURALITY OF PROCESSING STATIONS

(75) Inventors: Josef Kirschbauer, Blaibach (DE); Gunnar Kamp, Poing (DE); Axel Schwarzmeier, Selb (DE)

(73) Assignee: Muehlbauer AG, Roding (DE)

( * ) Notice: Subject to any disclaimer, the term of this patent is extended or adjusted under 35 U.S.C. 154(b) by 0 days.

(21) Appl. No.: 12/301,446

(22) PCT Filed: May 11, 2007

(86) PCT No.: PCT/EP2007/054549
§ 371 (c)(1),
(2), (4) Date: Feb. 27, 2009

(87) PCT Pub. No.: WO2007/134980
PCT Pub. Date: Nov. 29, 2007

(65) Prior Publication Data
US 2009/0152790 A1   Jun. 18, 2009

(30) Foreign Application Priority Data
May 19, 2006   (DE) .................. 10 2006 023 917

(51) Int. Cl.
B65H 29/00   (2006.01)
(52) U.S. Cl. .................. 271/184; 271/264; 271/3.14
(58) Field of Classification Search .................. 271/184, 271/299, 300, 303, 3.14, 264
See application file for complete search history.

(56) References Cited

U.S. PATENT DOCUMENTS

| | | | | |
|---|---|---|---|---|
| 5,271,490 A | * | 12/1993 | Sticht ......................... | 198/346.1 |
| 5,884,746 A | * | 3/1999 | Leisner et al. ............. | 198/346.1 |
| 6,027,020 A | * | 2/2000 | Meyer-Wittreck et al. ... | 235/381 |
| 6,269,930 B1 | * | 8/2001 | Dorner ........................ | 198/346.2 |
| 2009/0041572 A1 | * | 2/2009 | Brandner et al. ............. | 414/754 |

FOREIGN PATENT DOCUMENTS

| | | |
|---|---|---|
| CA | 2 651 355 | 11/2007 |
| DE | 196 10 739 A1 | 9/1997 |
| DE | 19610739 | 9/1997 |
| DE | 196 41 524 A1 | 4/1998 |
| DE | 19641524 | 4/1998 |
| DE | 198 40 811 | 3/2000 |
| DE | 19840811 | 3/2000 |
| EP | 0752971 | 8/1996 |
| EP | 0 752 971 | 1/1997 |
| EP | 0 863 482 | 9/1998 |
| EP | 0863482 | 9/1998 |
| WO | 2006069887 | 7/2006 |
| WO | WO 2006069887 | 7/2006 |
| WO | 2007128530 | 11/2007 |
| WO | WO 2007128530 | 11/2007 |

* cited by examiner

*Primary Examiner* — Stefanos Karmis
*Assistant Examiner* — Gerald W McClain
(74) *Attorney, Agent, or Firm* — John A. Miller; Miller IP Group, PLC

(57) ABSTRACT

A method for personalizing a plurality of documents and a personalization installation which comprises a plurality of processing stations arranged one behind the other along a longitudinal axis of the personalization installation for carrying out individual personalization steps, wherein in order to carry out the personalization steps the documents or smart cards run through one processing station in a first direction running transversely to the longitudinal axis and the other processing station in a second direction which is opposite to the first direction and likewise runs transversely to the longitudinal axis, wherein all the processing stations are oriented with their run-through directions transverse to the longitudinal axis.

6 Claims, 2 Drawing Sheets

METHOD AND SYSTEM FOR PERSONALIZING A MULTIPLICITY OF SECURITY DOCUMENTS USING A PLURALITY OF PROCESSING STATIONS

PRIORITY CLAIM

This application is a national phase application of PCT Application Ser. No. PCT/EP2007/054549 filed on May 11, 2007 which claims priority to German Application Ser. No. 10 2006 023 917.2 filed May 19, 2006, contents of which are incorporated herein.

FIELD OF THE INVENTION

The invention relates to a method for personalizing a large number of security documents or smart cards within a personalization installation.

BACKGROUND

To date, personalization installations for carrying out a method for personalizing a large number of security documents or smart cards are known in which processing stations for carrying out individual personalization steps on the security document running through them, e.g. a passport, are arranged one behind the other in such a way that they are assigned to a common main transport belt. Such processing stations, also known as processing modules, are oriented along the main transport belt in such a way that a security document runs through each processing station during the processing operation in the running direction of the main transport belt, i.e. the processing station is arranged above or below the main transport belt. The security documents arranged successively one behind the other thus run through the individual processing stations one after the other and undergo personalization operations of varying length that have to be carried out thereon, such as for example the printing of the surface, laser treatment of the surface to create a hologram, or a page-turning operation. Accordingly, the processing rate of the personalization installation as a whole depends on the personalization operation of the processing station which takes the longest processing time, so that the procedures of the entire personalization installation must be adapted thereto. As a result, the personalization installation has a low possible throughput compared to the processing times of the faster-operating processing stations.

In order to avoid such a "traffic jam" of security documents which would take place if the security documents in the fast processing stations upstream of the slow processing station were to carry on processing continuously at the time-optimized fast processing times, slower-operating processing stations are arranged in multiples along the transport belt in order to allow the simultaneous processing of a plurality of security documents. This may be achieved for example in the case of laser processing stations by moving the security documents or cards to and away from individual laser processing stations arranged next to one another at the side of the main transport belt, so that the security documents which would otherwise form a "traffic jam" can be distributed between various laser processing stations. However, this requires a high outlay on additional technical devices, namely on the one hand for belts and transport elements for lateral transport and on the other hand for the multiple arrangement of laser processing stations.

SUMMARY

An object of the present invention is to provide a method for personalizing a large number of security documents, documents of value or smart cards, and a personalization installation, in which fast, simple and cost-effective personalization of the documents or smart cards is possible.

One essential point of the invention lies in the fact that, in a method for personalizing a large number of security documents, documents of value or smart cards within a personalization installation which comprises a plurality of processing stations arranged one behind the other along a longitudinal axis of the personalization installation for carrying out individual personalization steps, in order to carry out the personalization steps the documents or smart cards run through one processing station in a first direction running transversely to the longitudinal axis and the other processing station in a second direction which is opposite to the first direction and likewise runs transversely to the longitudinal axis, wherein all the processing stations are oriented with their run-through directions transverse to the longitudinal axis. The documents or smart cards are thus transported from an output area of one processing station to an input area of the other processing station by means of transport elements which can move in the longitudinal direction of the personalization installation. That is to say that the documents or smart cards run through the first processing station in the first run-through direction and the second processing station in the second run-through direction, the third again in the first run-through direction and the fourth again in the second run-through direction. To this end, individual processing stations can be omitted by the transport element transporting the document or smart card in order to pass through specific selected processing stations which in their entirety carry out all the personalization steps necessary for a given card or a given security document. In this case, it is also possible for a plurality of processing stations of identical design to be arranged one behind the other in order thus to allow a distribution of the documents or smart cards between a plurality of processing stations which carry out a processing step or a personalization step which takes a lot of time. Such an arrangement of the processing stations with such a run-through direction advantageously means that the documents or smart cards can be processed simultaneously, that is to say at the same time, within the processing stations, resulting in a time saving during the processing of the documents or smart cards and thus in a higher throughput of the personalization installation as a whole.

Each processing station can be approached by the transport elements as often as necessary and in a pre-programmable and selectable or variable production sequence in any order so as to input the documents or smart cards and remove them again from the output area after processing and transport them away.

By arranging the processing stations in this way with a shuttle system formed on the left-hand and right-hand side which represents the transport element, not only is rapid processing achieved but also a simple and cost-effective design of the personalization installation, without the documents or smart cards having to be transported away laterally (as was previously necessary) from the main transport belt in a time-consuming manner in order to be fed to individual processing stations arranged next to one another.

The arrangement of the processing stations can be configured in any order and is preferably designed to be variable so that the processing stations which are designed as modules can be exchanged or omitted as required depending on the personalization steps to be carried out. This allows the use of a common table frame for the personalization installation, even if not all the processing station spaces within this frame are occupied.

Such methods and personalization installations can be used on security documents, such as passports and cards of value of any type having the ID1, ID2 or ID3 format.

The input and output areas arranged in each processing station outside the actual processing area can be occupied by security documents or smart cards regardless of the processing operation currently taking place. To this end, the input and output areas have input and output tray elements for depositing the documents or smart cards. The function thereof is to be considered as independent of the actual processing area of the processing station and allows the temporal decoupling of operations on a plurality of security documents or smart cards within a processing station. The input and output tray elements can also be considered as temporal buffer elements, in order to wait in the input area for the processing area to become free or to wait in the output area for collection by the transport element or the shuttle.

Due to the fact that the movement to and determination of the sequence of processing stations to be approached within the production sequence of the personalization installation as a whole can be freely selected by means of a control unit, this allows largely temporal decoupling between the production sequence as a whole within the personalization installation and the individual processing steps within the processing stations. This means that the total processing time of the documents or cards no longer depends on the processing time of the slowest-operating processing module. As a result, it is possible to achieve an increased throughput of the personalization installation which personalizes the documents or smart cards.

In the personalization installation for personalizing the large number of security documents or smart cards comprising a plurality of processing stations arranged one behind the other along the longitudinal axis thereof, by means of which processing stations individual personalization steps can be carried out on the security documents or smart cards, and in which each processing station is oriented with its run-through direction for the security documents or smart cards transverse to the longitudinal axis, first ends of the processing stations are connected by means of a first transport element which can move parallel to the longitudinal axis and second ends of the processing stations are connected by means of a second transport element which can move parallel to the longitudinal axis. These transport elements are displaceable tray elements which are assigned to the input and output areas of the individual processing stations and connect these to one another outside the processing stations.

As an alternative, the security documents, documents of value or smart cards can also be pushed directly into the processing station by the shuttle and undergo first processing operations during a pushing-in position. This may of course also take place in the opposite direction, that is to say during the transition from the processing station to the shuttle. Input and output areas are not absolutely necessary.

The tray elements designed as shuttles preferably run on a rail system which extends parallel to the longitudinal axis on both sides of the processing stations, wherein an input area of a processing station can also serve as the output area and in the normal case the input and output areas alternate in sequence from station to station along one of the movable shuttles, i.e. on one side of the processing stations.

Further advantageous embodiments emerge from the dependent claims.

BRIEF DESCRIPTION OF THE DRAWINGS

Advantages and expedient features can be found in the following description in conjunction with the figures, in which.

DETAILED DESCRIPTION OF THE INVENTION

Figure 1:
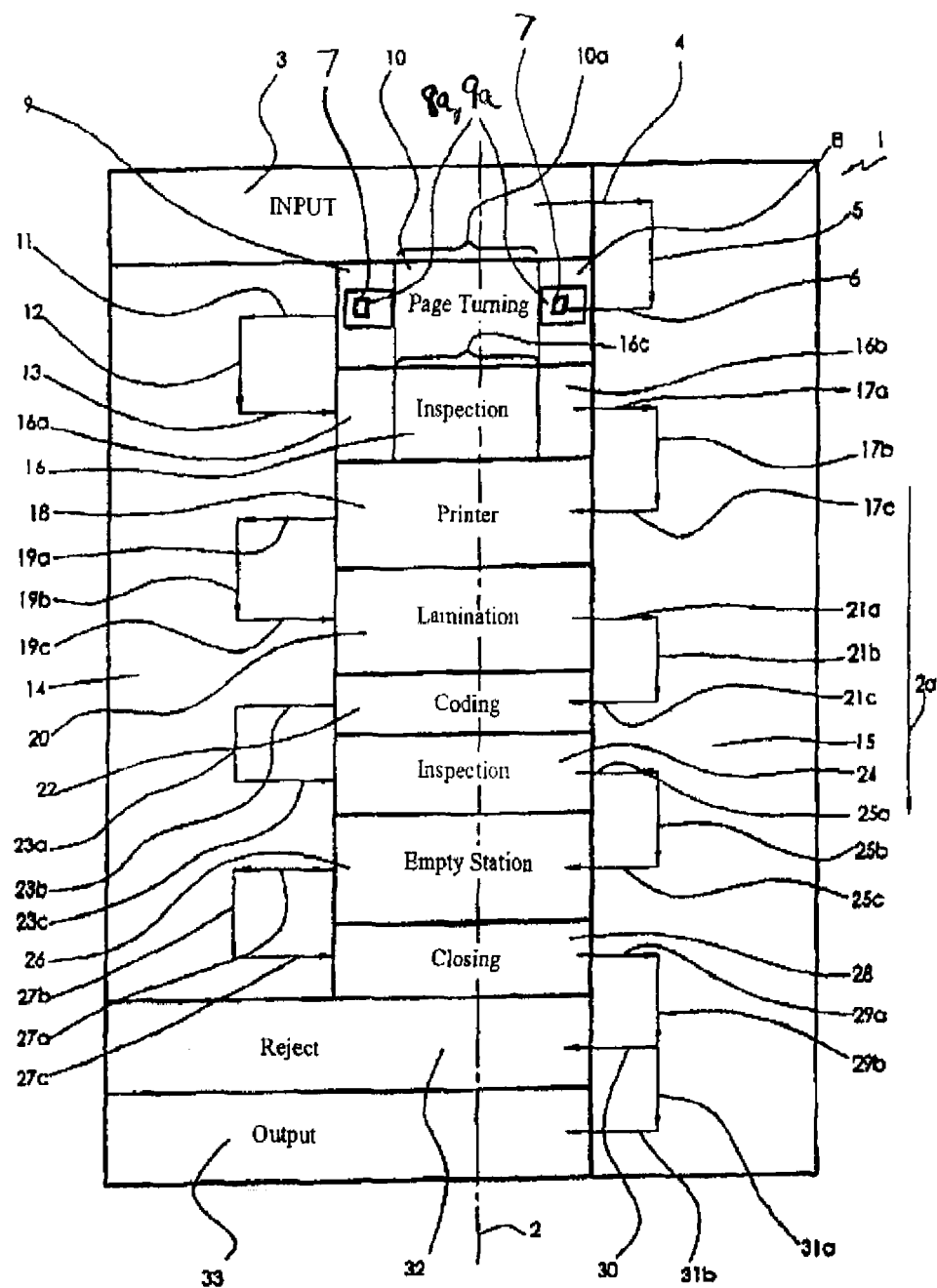
FIG. 1 shows a schematic diagram of a method procedure according to one embodiment of the invention taking place in a personalization installation.

FIG. 1 shows a plan view of a simplified design of a personalization installation with a method sequence according to one embodiment of the invention illustrated therein. The personalization installation 1 has a longitudinal axis 2, wherein each security document or each card, such as a smart card, runs through the personalization installation—considered as a whole—in the longitudinal axis direction 2a of this installation. To this end, a large number of security documents or smart cards are arranged in an input station 3 and are picked up in a direction 4 by means of a shuttle system (not shown here) which can be displaced back and forth parallel to the longitudinal axis 2 on the right-hand side of the stations.

The shuttle transports the document along the arrow direction 5 from the processing station 3 to a processing station 10 by assigning the document—as shown by an arrow 6—to an input area 8 of the processing station 10. To this end, the input area 8 has an input tray element 8a (only one is shown here as an example) for depositing the document 7.

After the security document has been transferred from the input area 8 to an actual processing area 10a, in which the pages of the document, for example a passport, are turned, the document is output at an output area 9 comprising an output tray element 9a (only one is shown here as an example).

Security documents 7 can be deposited both in the input area 8 and in the output area 9 while a page-turning operation as takes place in this processing station within the processing area 10a is carried out.

After processing of the security document within the processing station 10, the security document 7 is removed from the output area 9 by means of a further shuttle, which can be displaced in an area 14 parallel to the longitudinal axis 2 and is not shown here, moved a little along the longitudinal axis and then fed to an input area 16a of a further processing station 16, in which an inspection of the security document is carried out. This transport operation is illustrated by arrows 11, 12 and 13.

After passing through the input area 16a, carrying out the actual inspection operation in an inspection area 16c and passing through an output area 16b, the document is again removed along arrows 17a, 17b and 17c by means of the shuttle which can be displaced in an area 15, transported further along the longitudinal axis 2 and fed to a printing processing station 18. This and the subsequent processing stations may also have input and output areas (not shown here).

Removal on the left-hand side, further transport and feeding on the left-hand side then takes place as shown by arrows 19a-19c. A lamination operation is then carried out in a processing station 20 in order then to carry out a removal on the right-hand side, further transport and feeding on the right-hand side as shown by arrows 21a-21c to a processing station 22. In this processing station 22, a coding operation takes place for example on a chip of the security document.

Removal on the left-hand side, further transport and feeding on the left-hand side to an inspection station 24, in which an inspection of the coded data takes place, is then carried out as shown by arrows 23a-23c.

As shown by arrows 25a-25c, the document is then further transported on the right-hand side to an idle station 26 and then as shown by arrows 27a-27e to a closing station 28, in which the passport document is closed.

After removal of the closed passport document from the processing station 28 along an arrow 29a and further transport along arrow 29b, a decision is made as to whether or not the document has been personalized as desired. If the document has been personalized as desired, it is passed to an output station 33 as shown by arrows 31a and 31b. If the document has not been personalized as desired, it is discharged to a reject station 32 as shown by arrow 30.

By considering the diagram shown in FIG. 1 as a whole, it can be seen that the documents run through the individual processing stations one after the other in opposite directions, wherein each of these directions is oriented perpendicular to the longitudinal axis 2 preferably within a common plane.

Figure 2:
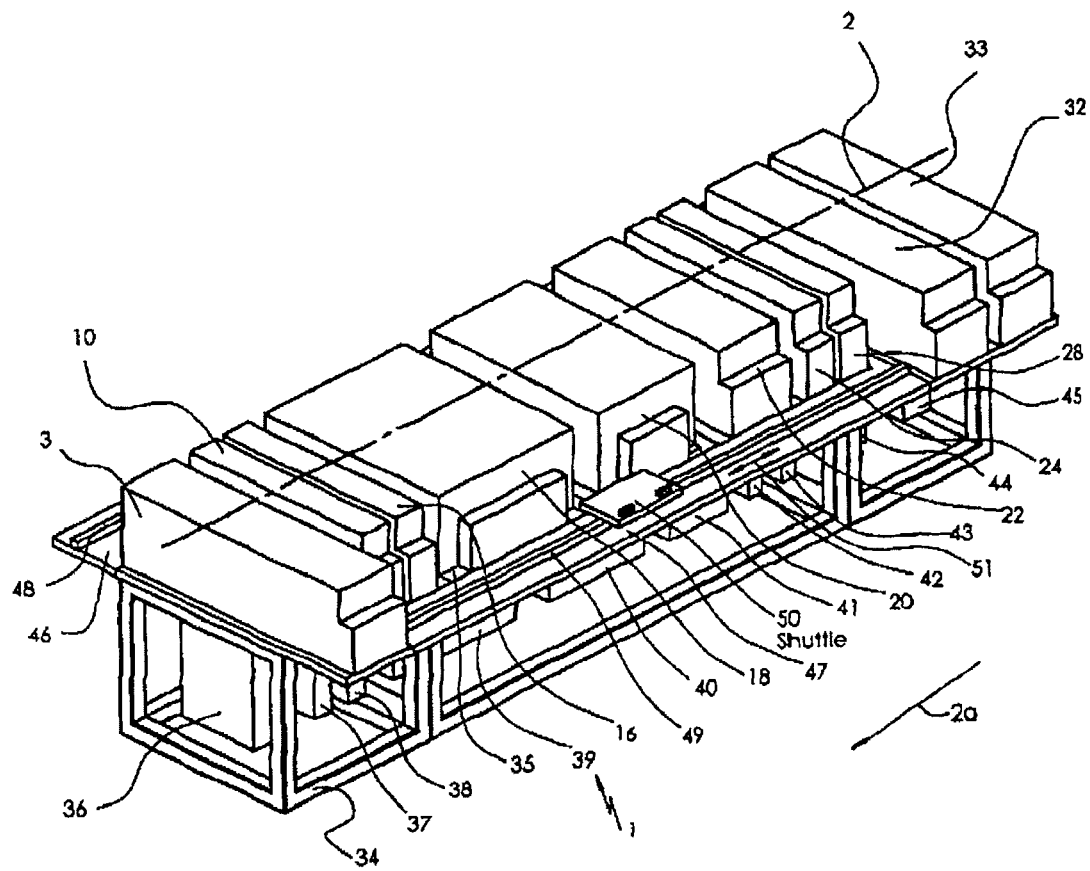
FIG. 2 shows a schematic perspective diagram of a personalization installation for carrying out the inventive method according to one embodiment of the invention.

FIG. 2 shows a perspective simple diagram of a personalization installation for carrying out the inventive method according to one embodiment of the invention. The personalization installation 1 once again comprises the processing stations 3, 10, 16, 18, 20, 22, 24, 28, 32 and 33 above a common tabletop 35 which is arranged on a common installation frame or table frame 34. The processing stations 3 as the input station and 32, 33 as the output and reject station are not processing stations in the same sense as the other processing stations, since no actual processing on the document itself takes place here.

It can clearly be seen from this diagram that the processing stations are oriented with their run-through direction transverse to the longitudinal axis 2 and are connected to one another by means of a shuttle system which is arranged on both sides of the actual processing stations 10, 16, 18, 20, 22, 24 and 28. The shuttle system is characterized by a rail system 46, 47, 48 and 49 and shuttles 50 arranged thereon which can be displaced along the longitudinal axis direction 2a as indicated by a double arrow 51.

All the processing stations advantageously comprise sub-modules 36, 37, 38, 39, 40, 41, 42, 43, 44 and 45 below the tabletop, in which usually electronic control systems and optionally at least partially a control unit for controlling the shuttle movements as a function of a specific desired production sequence are accommodated.

The shuttle 50 is preferably designed in such a way that it can remove documents or cards from the output areas of the processing stations by means of a pivoting movement or by means of a pusher (not shown here) and can feed them to an input area of a further processing station again by means of a pivoting movement or a pusher (not shown here).

All the features disclosed in the application documents are claimed as essential to the invention in so far as they are novel individually or in combination with respect to the prior art.

The invention claimed is:

1. A method for personalizing a plurality of security documents, said documents being redeemable for monetary value, or smart cards within a personalization installation which comprises a plurality of discrete processing stations arranged one behind the other along a longitudinal axis of the personalization installation for carrying out at least two individual personalization steps on the documents or smart cards, the method comprising:

running one of the documents or smart cards through a first discrete processing station for performing a first personalization step in a first direction running transversely to the longitudinal axis; and running each of the documents or smart cards through one of second and third discrete processing stations for performing a second personalization step in a second direction which is opposite to the first direction and running transversely to the longitudinal axis, wherein all the processing stations are oriented with their run-through directions transverse to the longitudinal axis, wherein the documents or smart cards run through the discrete processing stations arranged one behind the other that are to be run through by said documents alternately in the first and second directions, and depositing each document or smart card on an input tray element in an input area of a discrete processing station and on an output tray element in an output area of a discrete processing station, wherein the input tray element and the output tray element are located outside a processing area of the discrete processing station.

2. The method according to claim 1, further comprising transporting the documents or smart cards from the output area of the first discrete processing station to the input area of the second and third discrete processing stations by means of transport elements which can move in the longitudinal axis direction of the personalization installation.

3. The method according to claim 1, wherein the discrete processing stations that are to be run through by the documents or smart cards are pre-selected by means of a control unit, and the transport elements move to the selected discrete processing stations in a predefined order in order to input or output the documents or smart cards into or from the discrete processing stations.

4. The method according to claim 1, wherein one document or smart card is deposited on the input tray element and on the output tray element while a further document or smart card is being processed in the processing area of the discrete processing station.

5. A personalization installation system for personalizing a plurality of security documents, documents being redeemable for monetary value or smart cards, comprising:

a plurality of discrete processing stations arranged one behind the other along a longitudinal axis of the personalization installation, wherein the plurality of discrete processing stations include:

a first discrete processing station configured to carry out a first individual personalization step on the documents or smart cards and having a run-through direction in a first direction transverse to the longitudinal axis; and second and third discrete processing stations configured to carry out a second individual personalization step on the documents or smart cards and having a run-through direction for the documents or smart cards in a second direction transverse to the longitudinal axis, wherein the documents or smart cards are run through one of the second and third discrete processing stations, wherein the documents or smart cards run through the discrete processing stations arranged one behind the other that are to be run through by said documents alternately in the first and second directions, and wherein first ends of the discrete processing stations are connected by at least one first transport element which can move parallel to the longitudinal axis and second ends of the discrete processing stations are connected by at least one second transport element which can move parallel to the longitudinal axis, and wherein the first and second ends comprise input and output areas of the discrete processing stations, in which input and output tray elements for depositing the documents or smart cards are arranged outside an intermediate processing area of the discrete processing stations.

6. The personalization installation according to claim 5, wherein the movable transport element is a displaceable tray element.

* * * * *